US008647055B2

(12) United States Patent
Foster et al.

(10) Patent No.: US 8,647,055 B2
(45) Date of Patent: Feb. 11, 2014

(54) CERAMIC MATRIX COMPOSITE SHROUD ATTACHMENT SYSTEM

(75) Inventors: Gregory Thomas Foster, Greer, SC (US); Robert Coign, Piedmont, SC (US); Kevin McGovern, Simpsonville, SC (US); David Weber, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 477 days.

(21) Appl. No.: 13/064,815

(22) Filed: Apr. 18, 2011

(65) Prior Publication Data

US 2012/0263582 A1 Oct. 18, 2012

(51) Int. Cl.
*F01D 25/28* (2006.01)

(52) U.S. Cl.
USPC .......................................... 415/139; 415/173.1

(58) Field of Classification Search
USPC ................ 415/134, 139, 173.1, 213.1, 173.4, 415/174.4; 416/189, 191, 192
See application file for complete search history.

(56) References Cited

U.S. PATENT DOCUMENTS

2005/0042081 A1* 2/2005 Girard et al. ............... 415/173.4
2011/0085899 A1* 4/2011 Foster et al. .................. 415/189

* cited by examiner

*Primary Examiner* — Edward Look
*Assistant Examiner* — Juan G Flores
(74) *Attorney, Agent, or Firm* — Nixon & Vanderhye

(57) ABSTRACT

Shroud assembly for use in a turbine, having an outer shroud having a side proximate to flow of operative fluid of the turbine, the side having a boss and an outer shroud aperture extending through the boss. An inner shroud is located between the side of the outer shroud proximate to the flow of operative fluid and the operative fluid flow of the turbine, the inner shroud having an inner shroud aperture which is dimensioned to fit over the boss.

25 Claims, 7 Drawing Sheets

CERAMIC MATRIX COMPOSITE SHROUD ATTACHMENT SYSTEM

The present invention relates to a method for attaching a ceramic matrix composite (CMC) shroud and discourager to a metal outer shroud in such as way as to allow for adjustment of the CMC shroud and/or the discourager, for example during installation or due to expansion and/or contraction, while preventing hot gas in the turbine from reaching the outer metal shroud. The method involves utilizing a key slot arrangement for connecting the CMC shroud and discourager to the outer metal shroud.

BACKGROUND OF THE INVENTION

It is well known that industrial gas turbine and aircraft engine shrouds operate in a high temperature environment and require cooling methods to obtain a useful design life cycle. An alternative to using a metal shroud with cooling air is to use a CMC material for the shroud, thus eliminating the required cooling of the shroud due to the CMC's superior temperature capability over metal.

Prior attempts to solve this problem have been made using conventional metal seals or complex assemblies. For example, one approach has been to use multiple pins to hold the CMC or to use hooks formed in the CMC component. Other prior art uses a CMC bonded to a ceramic core with pins going through the core.

These arrangements utilizing pins have two distinct disadvantages, namely (1) additional cooling air is required to maintain design life of the seal, and (2) higher cost due to the use of expensive high temperature custom made metal pins. Metal pins at the flow-path also require cooling air to meet the required design life, thus reducing the benefit of the CMC.

A more effective way of mounting the CMC shroud to the outer metal shroud and preventing hot gases from contacting the metal outer shroud is desirable. The present invention seeks to satisfy that desire.

BRIEF DESCRIPTION OF THE INVENTION

In one aspect, the invention provides a shroud assembly for use in a turbine. The shroud assembly has an outer shroud with a side proximate to a flow of an operative fluid of the turbine, the side being provided with a boss and an aperture extending through the boss. An inner shroud is positioned between the side of the outer shroud proximate to the flow of operative fluid and the operative fluid flow of the turbine. The inner shroud is provided with an aperture which is dimensioned to fit over the boss.

In another aspect, a discourager assembly is enclosed within the inner shroud and is positioned offset from the inner shroud so as to extend past the inner shroud and into an inner shroud of a neighboring shroud assembly. The discourager assembly has a discourager with an aperture and a plate member with an aperture mounted on a surface of the discourager. The discourager aperture and the plate member aperture are aligned with the inner shroud aperture and the boss to facilitate insertion of a bolt to fasten the assembly together.

In another embodiment, the boss in the outer shroud is upstanding above the plane of the surface of the outer shroud in which the boss is present. The boss generally has a square profile when viewed in plan, and typically has rounded corners.

In a further embodiment, the apertures in the inner shroud and the discourager are rectangular shaped in which the longer opposite sides of the rectangle are separated by a distance which is slightly larger than the distance between the opposite sides of the square boss in the outer shroud. In this way, the rectangular slot of the shroud or the discourager can be placed over the square boss such that the upstanding surfaces of the boss can be in contact with, and slide relative to, the longer sides of the rectangular aperture, thereby allowing for adjustment of the position of the discourager within the inner shroud.

In yet another embodiment, the plate member has at least one aperture which aligns with the boss of the outer shroud and the rectangular aperture of the inner shroud. In a typical embodiment, the plate member is provided with two apertures which align with two bosses and two rectangular apertures in the inner shroud.

In a further embodiment, the plate member is accommodated in a recess in a surface of the discourager. In an alternative embodiment, the plate member is housed in an internal space within the discourager.

The apertures in the plate member are typically threaded to accommodate a fastening means such as a bolt. In this way, the inner shroud/discourager assembly can be mounted to the outer shroud by way of a bolt threadedly engaged with the plate member without the bolt force being applied directly to the inner shroud. Adjustment of the discourager within the inner shroud can be achieved by sliding relative movement of the discourager or the inner shroud by virtue of the rectangular apertures, prior to tightening with the bolt.

The size and stiffness of the plate member is used to tune the amount of radial spring force that is applied to the inner shroud and discourager. The bolt is contained in the outer shroud block where cooling is not necessary. Typically, the inner shroud is fabricated from a ceramic matrix composite (CMC) which allows for greatly reduced cooling air requirements.

Use of a CMC inner shroud with no cooling air additionally affords the advantage of an engine performance benefit in efficiency and output. The invention enables the use of CMC inner shrouds at a much lower cost structure than has previously been possible. The attachment method of the invention does not require the use of custom pins made from exotic materials, and thus reduces the overall cost of the associated hardware. In addition, the attachment is shielded from the hot gas environment, thereby significantly reducing the cooling and purge air requirements of the attachment compared to what has been done previously.

DETAILED DESCRIPTION OF THE INVENTION

Figure 1:
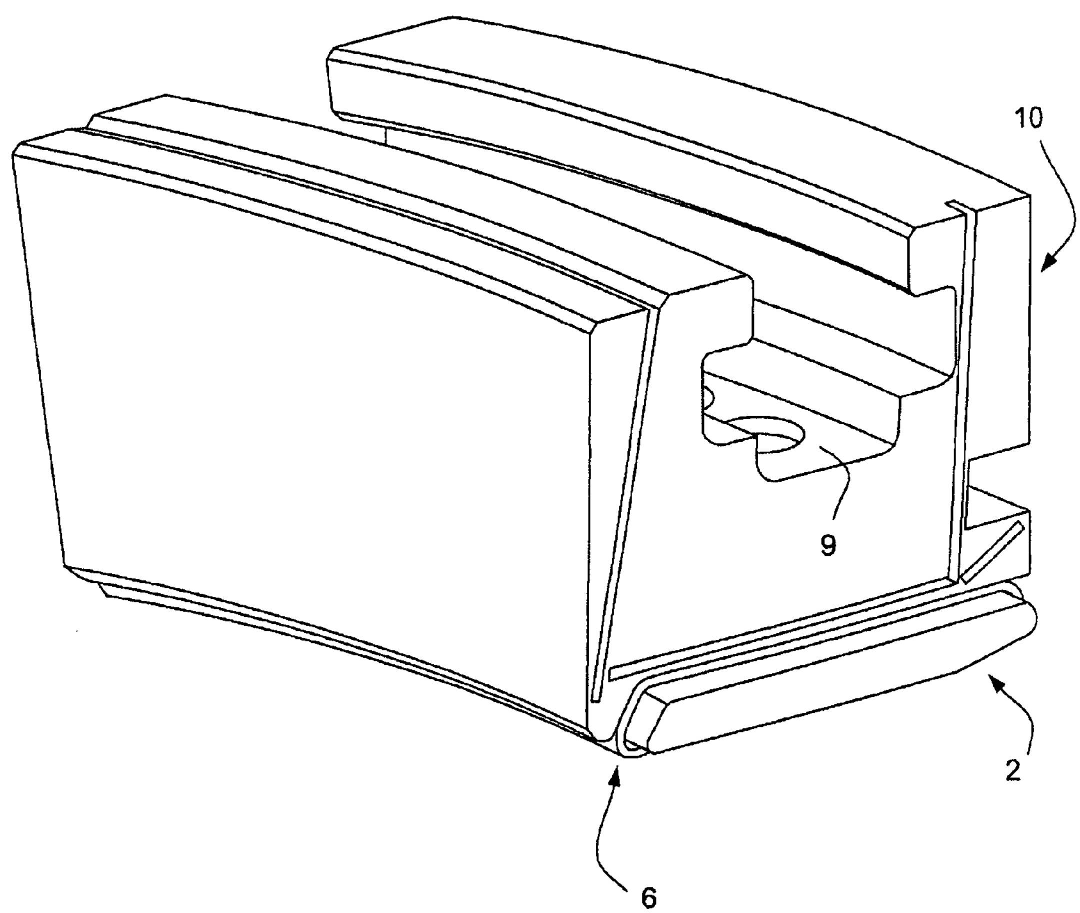
FIG. 1 is a perspective view of an outer metal shroud assembly including a hollow CMC inner shroud and discourager seal located internally of the CMC inner shroud.

Referring to the drawings, FIG. 1 is a perspective view of an outer shroud assembly of the invention. The assembly includes an outer metal shroud 10 having an aperture 9 extending therethrough, a hollow CMC shroud 6 having apertures 14 therein (shown in more detail in FIG. 6) and a discourager seal 2 having apertures 11 therein (shown in more detail in FIG. 9) located internally of the CMC shroud 6.

Figure 2:
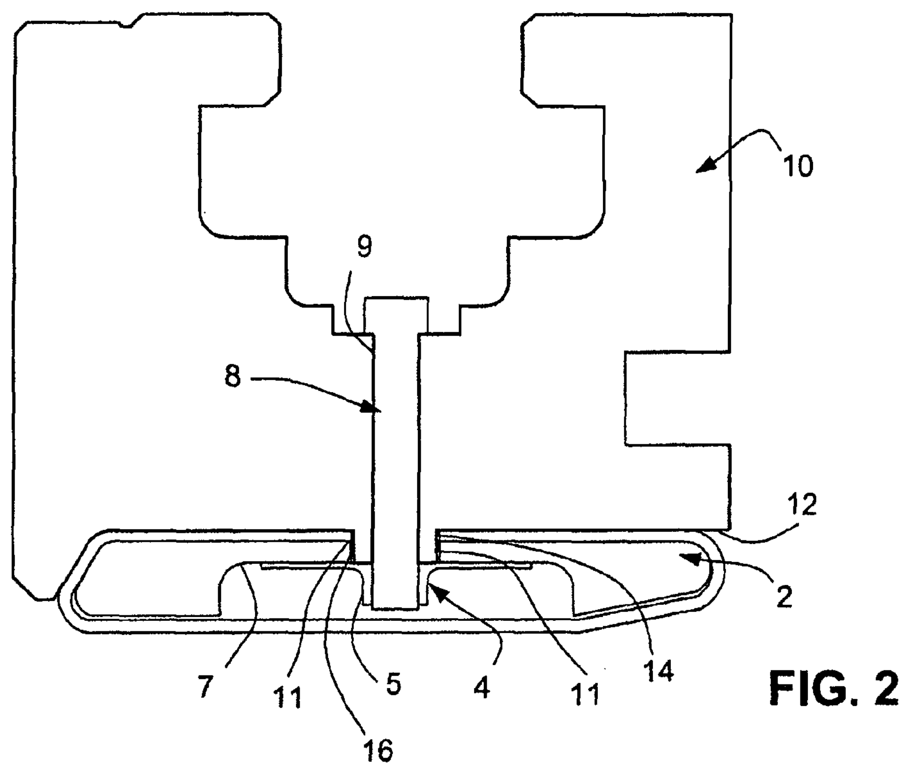
FIG. 2 is a cross-sectional end view of the outer metal shroud assembly of FIG. 1 showing attachment of the CMC inner shroud and discourager seal assembly via a plate member/bolt arrangement to a boss on a surface of the outer metal shroud.

FIG. 2 is a cross-sectional end view of the outer shroud assembly of FIG. 1, and shows attachment of the CMC shroud 6 and discourager seal 2 via a plate member/bolt arrangement to a boss 16 on a surface of the outer shroud 10. The apertures 11 of discourager 2 are dimensioned such that bosses 16 on the outer metal shroud 10 fit into the apertures 11. A metal plate member 4 having threaded apertures 5 is provided in recess 7 in the discourager 2.

The assembly of the CMC shroud 6, the discourager 2 and the plate member 4 is mounted to the outer metal shroud 10 by aligning apertures 14 in the CMC shroud, apertures 11 in the discourager and threaded apertures 5 in the plate member 4 over the bosses 16 in the outer metal shroud, passing a fastening means such as a bolt 8 through aperture 9 in the outer metal shroud 10, through the boss 16 and threadedly engaging with the threaded apertures 5 of the plate member 4. Tightening the bolt 8 pulls the CMC shroud/discourager/plate member assembly into tight contact with surface 12 of the outer metal shroud, as shown in FIG. 2.

The discourager and its function are disclosed in copending application Ser. No. 12/576,386, the disclosure of which is incorporated herein by reference.

Figure 3:
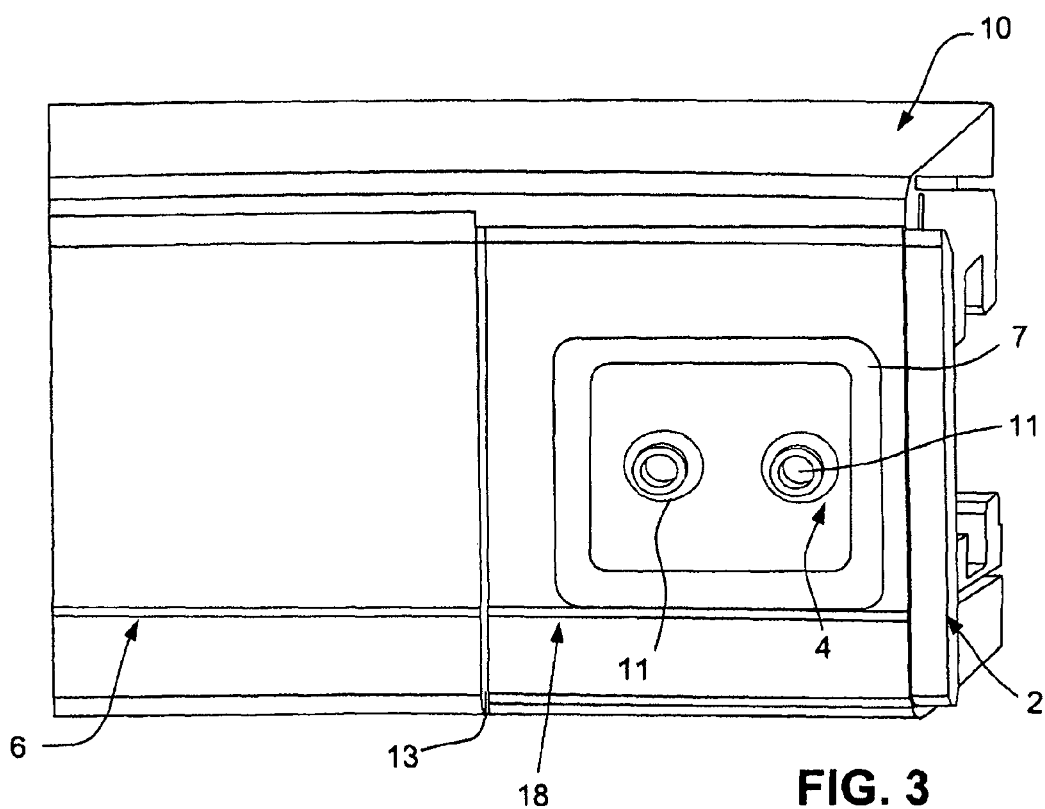
FIG. 3 is a view of the outer metal shroud assembly of FIG. 1 from the underside showing the plate member with two threaded apertures mounted on a surface of the discourager and aligned with two bosses in the outer metal shroud.

FIG. 3 is a view of the outer shroud assembly 10 from the underside showing (for ease of understanding, this is shown as if the CMC shroud 6 was transparent) the plate member 4 with two threaded apertures 5, mounted in a recess 7 of the discourager 2. In the embodiment shown, the threaded apertures 5 are formed as raised boss members 5 to provide extra thread length for the bolt 8.

FIG. 3 illustrates the situation where there are two CMC shrouds 6 mounted to the outer metal shroud with a small gap 13 therebetween. In this arrangement, the corresponding discouragers disposed internally of the CMC shrouds are adjusted relative to the CMC shrouds to create an overlap region 18 such that the gap 13 is essentially blocked by the discourager. In this way, each discourager prevents hot gas from having a direct line of sight to the metal outer shroud 10 and establishes a tortuous path through the gap 13 to the outer metal shroud 10. This in turn allows for the use of conventional metallic seals in the outer shroud 10 to provide for effective sealing of the secondary flow leakages around the outer shroud 10.

Figure 4:
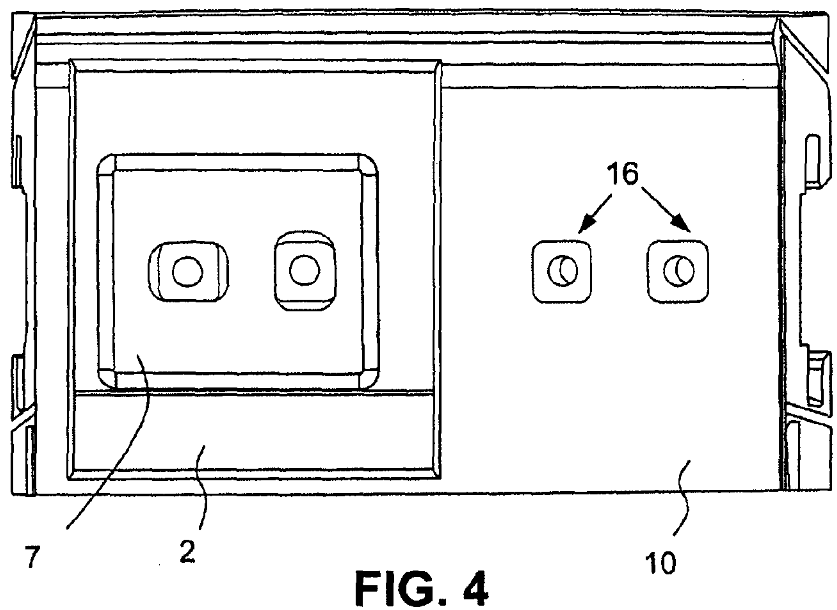
FIG. 4 is a view of the underside of the outer metal shroud showing upstanding generally square bosses on the right hand side and a discourager on the left hand side with a recess but without the plate member mounted in the recess.
Figure 5:
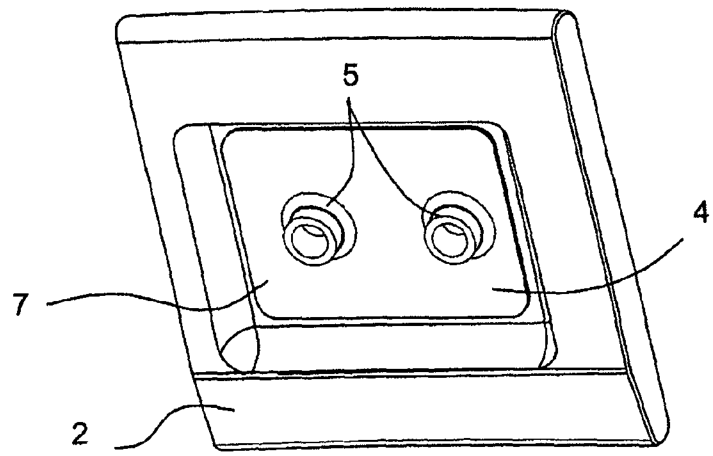
FIG. 5 is a perspective view of the discourager shown in FIG. 4 but with the plate member positioned in the discourager recess and having two threaded boss members in the plate member which align with the bosses in the outer metal shroud.

FIG. 4 is a view of the underside of the outer metal shroud 10 showing upstanding generally square bosses 16 on the right hand side, and a discourager 2 on the left hand side with a recess 7 but without the plate member 4 mounted in the recess 7. FIG. 5 is a perspective view of the discourager 2 shown in FIG. 4 but with the plate member 4 positioned in the discourager recess 7 and having two threaded raised boss members 5 in the plate member 4 which align with the bosses 16 in the outer metal shroud 10.

Figure 6:
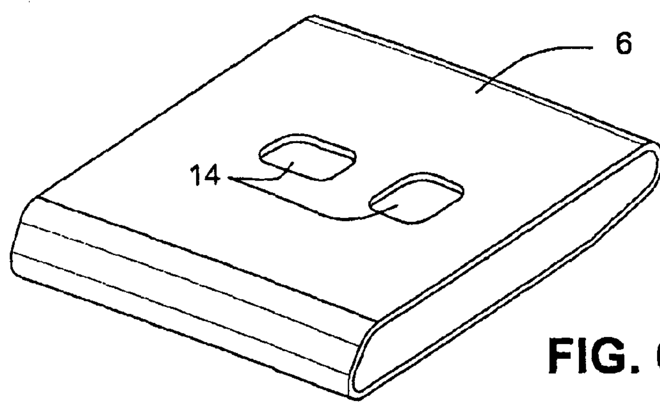
FIG. 6 is a perspective view of the CMC inner shroud showing a pair of rectangular key slots which align with the bosses on the outer metal shroud and the boss members on the plate member.

FIG. 6 is a perspective view of the CMC shroud 6 showing a pair of rectangular key slots 14 which are positioned to align with the bosses 16 on the outer metal shroud 10 and the boss members 5 on the plate member 4. Each rectangular key slot 14 is dimensioned such that the distance separating the longer opposite sides of the rectangle is slightly greater than the length of the sides of the square bosses 16 in order to allow the key slots to fit over and slide relative to the square bosses 16 on the outer metal shroud 10, thereby allowing for positional adjustment of the CMC shroud 6 with respect to the outer metal shroud 10 because of differences in thermal expansion of the components due to them being made from different materials, i.e. CMC expands differently than metal.

In the embodiment shown in FIG. 6, the rectangular key slots 14 are arranged in the CMC shroud 6 such that the longitudinal axis of one rectangle (i.e., the axis parallel to the longer sides of the rectangle) is perpendicular to the axis of the other. This allows for additional positional adjustment of the CMC shroud 6 relative to the outer metal shroud 10 for the same reasons as discussed above.

Figure 7:
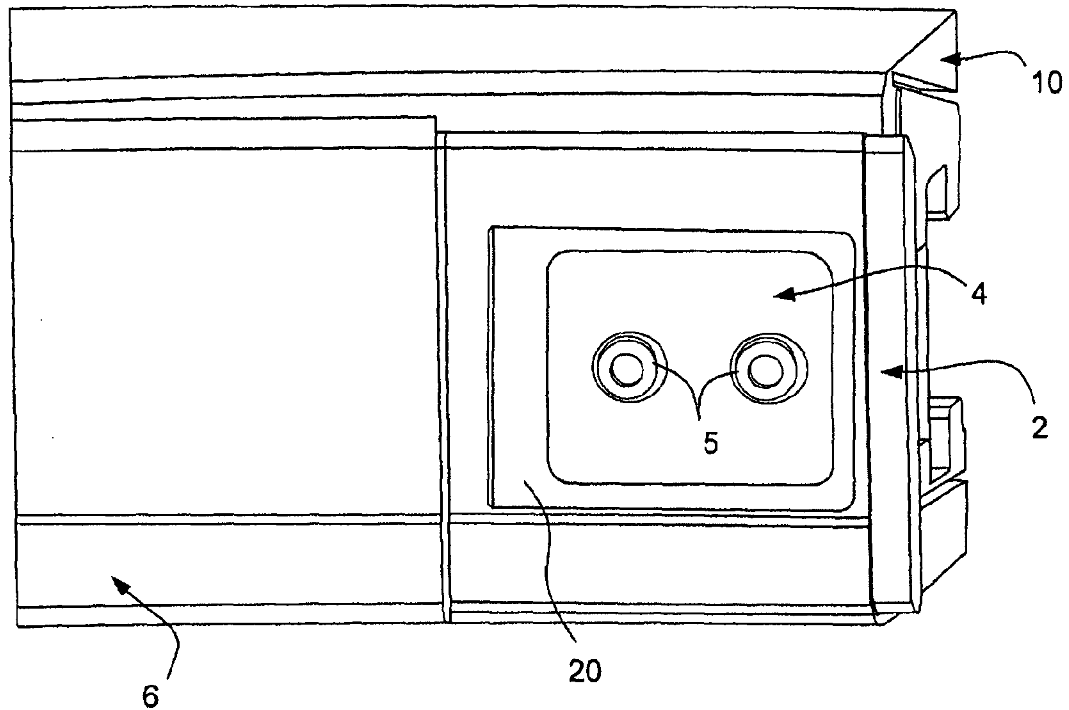
FIG. 7 shows an alternative embodiment of the outer shroud assembly of FIG. 1 from the underside showing an internal space or pocket in the discourager for housing the plate member and showing two apertures which communicate with the internal space and which align with the apertures in the plate member.

FIG. 7 shows an alternative embodiment of the outer shroud assembly from the underside showing an internal space or pocket 20 in the discourager 2 for housing the plate member 4. The discourager 2 is provided with two apertures 11 which communicate with the internal space 20 and which align with the apertures 5 in the plate member 4.

Figure 8:
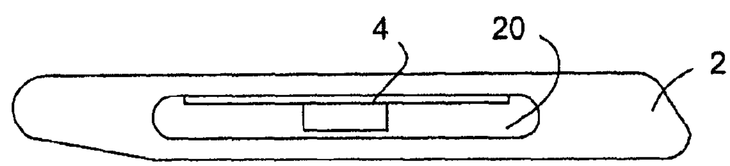
FIG. 8 is an end view of the discourager shown in FIG. 7 showing the internal space with the plate member in position.

FIG. 8 is an end view of the discourager 2 shown in FIG. 7. In this view, the plate member 4 is in position within the internal space 20.

Figure 9:
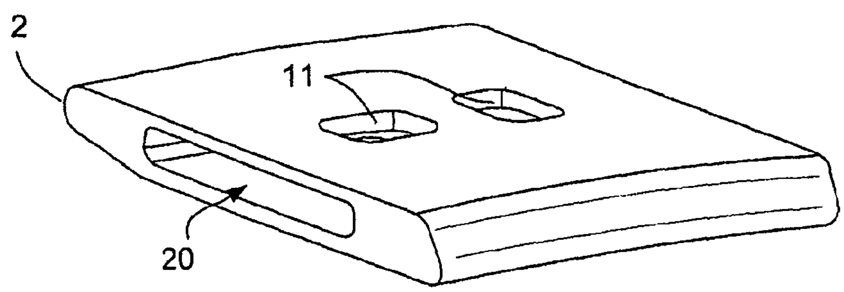
FIG. 9 is a perspective view of the discourager of FIG. 8.

FIG. 9 is a perspective view of the discourager of FIG. 8. The rectangular apertures 11 are positioned to align with the bosses 16 on the outer metal shroud 10 and the boss members 5 on the plate member 4. Each rectangular aperture 11 is dimensioned such that the distance separating the longer opposite sides of the rectangle is slightly greater than the length of the sides of the square bosses 16 in order to allow the apertures to fit over and slide relative to the square bosses 16 on the outer metal shroud 10. This allows for positional adjustment of the discourager 2 in the axial and tangential directions to the outer shroud 10 with respect to the CMC shroud 6 and the outer metal shroud 10, as discussed above.

Figure 10:
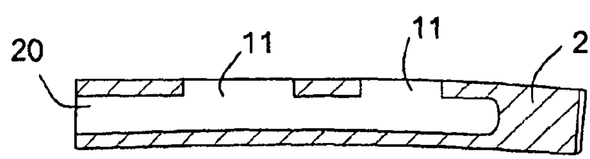
FIG. 10 is cross-section showing the discourager of FIG. 8 without the plate showing the internal space and two apertures communicating with the internal space.

FIG. 10 is a cross-section showing the discourager 2 of FIG. 8 without the plate 4. The internal space 20 is shown with two apertures 11 communicating with the internal space 20.

Figure 11:
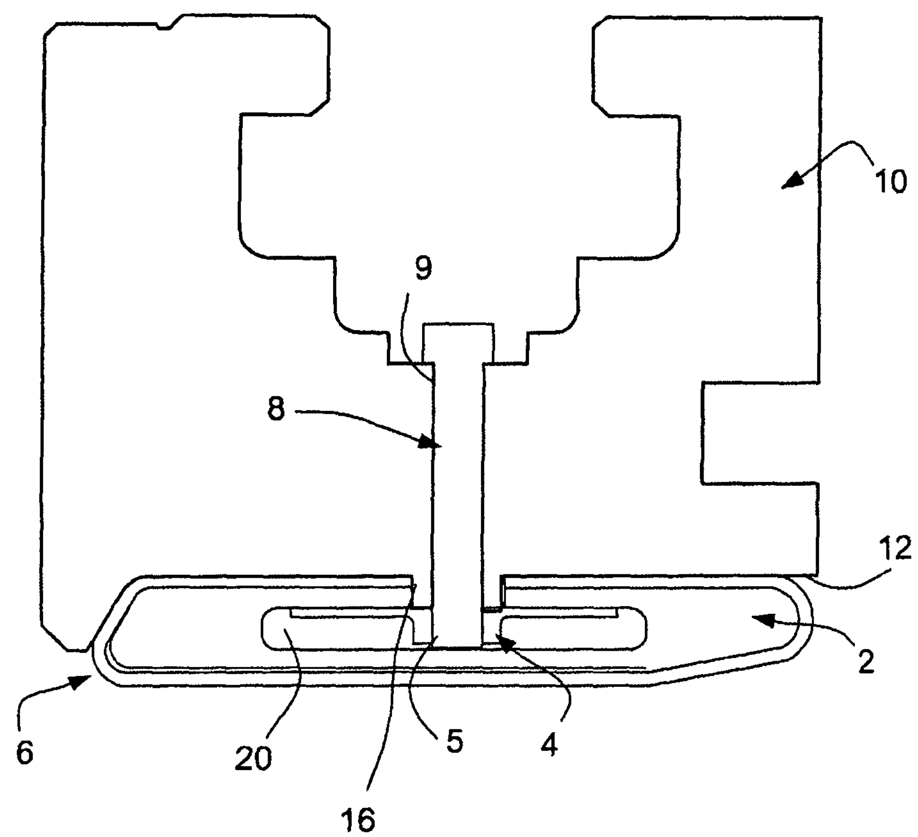
FIG. 11 is an alternative cross-section of the outer shroud assembly of FIG. 7 showing the discourager with the internal space and the plate member within the internal space, and a bolt extending through the boss of the outer metal shroud into the threaded apertures of the plate member to tighten the CMC shroud and discourager up against the outer metal shroud.

FIG. 11 is an alternative cross-section of the outer shroud assembly of FIG. 7. In this arrangement, the discourager 2 is provided with internal space 20 and plate member 4 within the internal space, and a bolt 8 extends through aperture 9 in the boss 16 of the outer metal shroud 10 into the threaded apertures 5 of the plate member 4 to tighten the CMC shroud 6 and discourager 2 up against surface 12 of the outer metal shroud 10.

Figure 12:
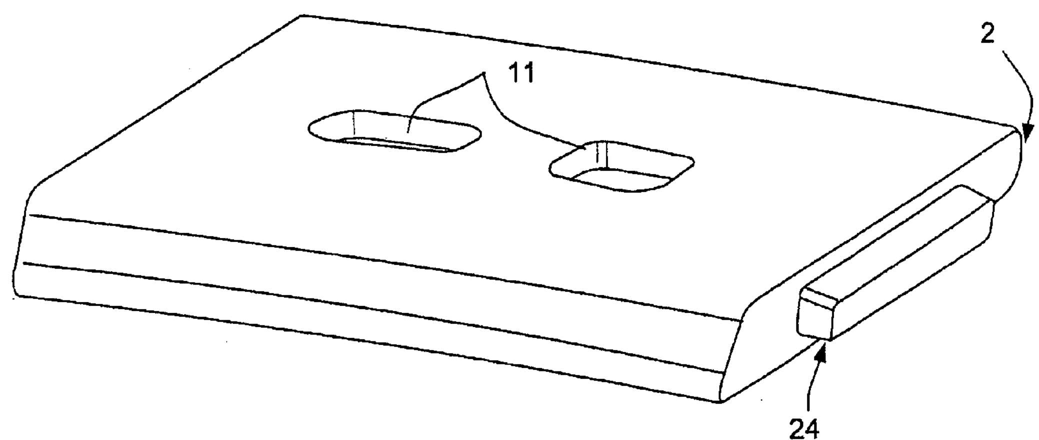
FIG. 12 is a perspective view of an alternative embodiment of a discourager having a male configured shiplap feature for permitting connection to a corresponding female configured discourager.
Figure 13:
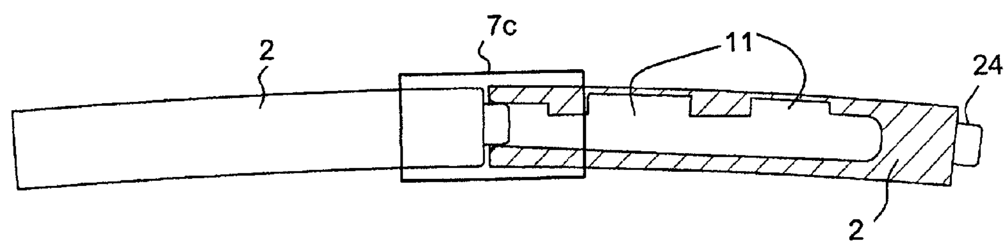
FIG. 13 shows discouragers of different units connected to each other via the shiplap arrangement.
Figure 14:
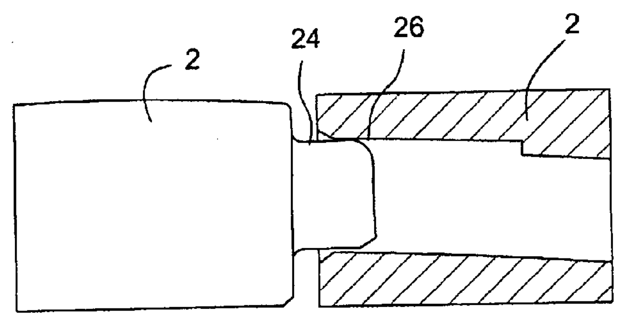
FIG. 14 is an enlarged view of Box B in FIG. 13.

FIG. 12 is a perspective view of an alternative embodiment of a discourager 2 having a male configured shiplap 24. This permits connection to a discourager provided with a corresponding female portion 26, such as shown in FIGS. 13 and 14. FIG. 14 is an enlarged view of Box 7*c* in FIG. 13.

Figure 15:
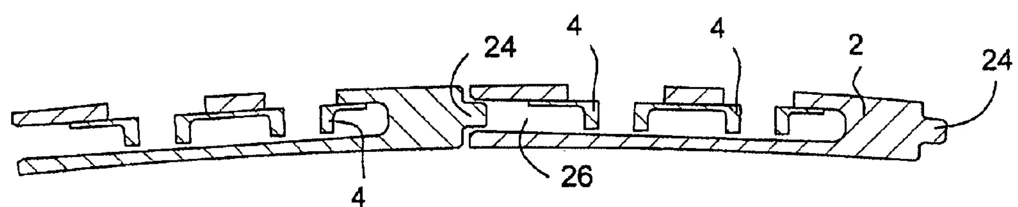
FIGS. 15 and 16 are cross-sectional views of discouragers connected to each other via the shiplap arrangement illustrated in FIG. 12, one with the plate member present (FIG. 15) and one with the plate member absent (FIG. 16).
Figure 16:
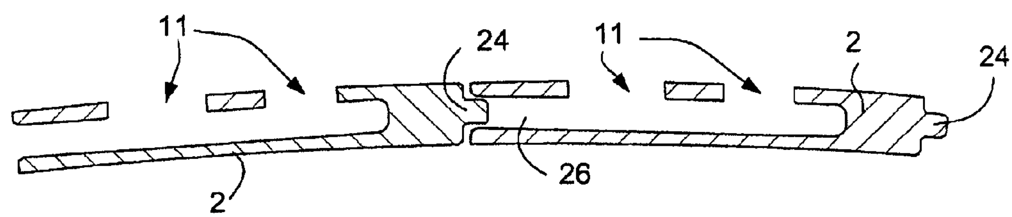

FIGS. 15 and 16 are cross-sectional views of discouragers connected to each other via a shiplap arrangement 24,26. In FIG. 15, the plate member 4 is present and in FIG. 16, the plate member 4 is absent.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A shroud assembly for use in a turbine, the shroud assembly comprising:

an outer shroud having a side proximate to a flow of an operative fluid of the turbine, the side provided with a boss and an outer shroud aperture extending through the boss; and an inner shroud positioned between the side of the outer shroud proximate to the flow of operative fluid and the operative fluid flow of the turbine, the inner shroud provided with an inner shroud aperture which is dimensioned to fit over the boss.

2. A shroud assembly according to claim 1 further comprising a discourager assembly enclosed within the inner shroud, the discourager assembly positioned offset from the inner shroud so as to extend past the inner shroud and into an inner shroud of a neighboring shroud assembly, the discourager assembly comprising a discourager having a discourager aperture and a plate member having a plate member aperture mounted on a surface of the discourager, the discourager aperture and the plate member aperture being aligned with the inner shroud aperture and the boss.

3. The shroud assembly of claim 2, wherein the plate member aperture is threaded.

4. The shroud assembly of claim 2, wherein the plate member comprises a raised boss through which said aperture extends.

5. The shroud assembly of claim 2, wherein the plate member is mounted in a recess in a surface of the discourager.

6. The shroud assembly of claim 2, wherein the plate member is mounted in an internal space in said discourager.

7. The shroud assembly of claim 2, wherein the discourager is provided with a shiplap connector.

8. The shroud assembly of claim 2, further comprising a bolt extending through the outer shroud aperture, the inner shroud aperture, the discourager aperture and the plate member aperture to hold the shroud assembly together.

9. The shroud assembly of claim 1, wherein the boss is of a square configuration and has raised side walls.

10. The shroud assembly of claim 9, wherein the inner shroud aperture is rectangular and is dimensioned such that such that the distance separating the longer opposite sides of the rectangle is slightly greater than the length of the sides of the square boss.

11. The shroud assembly of claim 10, wherein the rectangular inner shroud apertures are arranged such that the longitudinal axis of one rectangle is perpendicular to the axis of the other.

12. The shroud assembly of claim 9, wherein the discourager aperture is rectangular and is dimensioned such that such that the distance separating the longer opposite sides of the rectangle is slightly greater than the length of the sides of the square boss.

13. A shroud assembly for use in a turbine, the shroud assembly comprising:

an outer shroud having a side proximate to a flow of an operative fluid of the turbine, the side provided with at least two bosses each boss having an outer shroud aperture extending through the boss; and at least two inner shrouds positioned adjacent each other to form an expansion space, the inner shrouds located between the side of the outer shroud proximate to the flow of operative fluid and the operative fluid flow of the turbine, each inner shroud provided with at least two inner shroud apertures which are dimensioned to fit over the at least two bosses.

14. A shroud assembly according to claim 13 further comprising at least two discourager assemblies enclosed within the inner shrouds, the discourager assemblies positioned offset from the inner shrouds so as to cover the expansion space, each discourager assembly comprising a discourager having at least two discourager apertures and a plate member having at least two plate member apertures mounted on a surface of the discourager, the discourager apertures and the plate member apertures being aligned with the inner shroud apertures and the bosses.

15. The shroud assembly of claim 14, wherein the plate member apertures are threaded.

16. The shroud assembly of claim 14, wherein the plate members comprise raised bosses through which said plate member apertures extend.

17. The shroud assembly of claim 14, wherein the plate members are each mounted in a recess in a surface of the discourager.

18. The shroud assembly of claim 14, wherein each plate member is mounted in an internal space in the discourager.

19. The shroud assembly of claim 14, wherein the discourager is provided with a shiplap connector.

20. The shroud assembly of claim 14, further comprising at least one bolt extending through the outer shroud apertures, the inner shroud apertures, each discourager apertures and the plate member apertures to hold the shroud assembly together.

21. The shroud assembly of claim 13, wherein each boss is of a square configuration and has raised side walls.

22. The shroud assembly of claim 21, wherein the inner shroud apertures are rectangular and each dimensioned such that such that the distance separating the longer opposite sides of the rectangle is slightly greater than the length of the sides of each square boss.

23. The shroud assembly of claim 22, wherein the rectangular inner shroud apertures are arranged such that the longitudinal axis of one rectangle is perpendicular to the axis of the other.

24. The shroud assembly of claim 21, wherein the discourager apertures are rectangular and are dimensioned such that the distance separating the longer opposite sides of the rectangle is slightly greater than the length of the sides of the square bosses.

25. The shroud assembly of claim 24, wherein the rectangular discourager apertures are arranged such that the longitudinal axis of one rectangle is perpendicular to the axis of the other.

* * * * *